United States Patent [19]

Lauffer

[11] 4,187,007
[45] Feb. 5, 1980

[54] EYEGLASS CONSTRUCTION

[75] Inventor: John R. Lauffer, Seekonk, Mass.

[73] Assignee: Martin-Copeland Company, East Providence, R.I.

[21] Appl. No.: 944,659

[22] Filed: Sep. 18, 1978

[51] Int. Cl.² .............................................. G02C 1/04
[52] U.S. Cl. .................................. 351/108; 351/105; 351/109
[58] Field of Search ................ 351/103, 108, 60, 111, 351/158, 123, 141, 105, 109; 29/280

[56] References Cited

U.S. PATENT DOCUMENTS

| | | | |
|---|---|---|---|
| 2,178,038 | 10/1939 | Harbour | 351/60 |
| 2,371,910 | 3/1945 | Nerney | 351/108 |
| 2,477,125 | 7/1949 | Guillet | 351/108 |
| 3,639,044 | 2/1972 | Blair | 351/103 |

FOREIGN PATENT DOCUMENTS

| | | | |
|---|---|---|---|
| 145048 | 2/1952 | Australia | 351/108 |
| 1047421 | 10/1957 | France | 351/108 |
| 676998 | 1/1950 | United Kingdom | 351/108 |

Primary Examiner—John K. Corbin
Assistant Examiner—B. Wm. de los Reyes
Attorney, Agent, or Firm—Salter & Michaelson

[57] ABSTRACT

An eyeglass construction in which the separate lenses thereof are directly attached to a laterally extending brow bar includes a pair of rearwardly extending threaded posts adapted to pass through spaced openings in the upper peripheral portion of each lens whereby the lenses and brow bar are affixed to each other by nuts engaging said threaded posts, said openings and posts extending substantially perpendicular to the rear plane of each lens. Each of the posts is adapted to extend through a spacing bushing disposed between the opposed lens and brow bar surfaces such that the lenses and the brow bar are spaced away from each other, thus providing clearance between the lens and the brow bar, even at the point of maximum curvature of the lens. The length of the bushings may be modified such that varying lens curvatures may be facilitated and still maintained out of contact with the brow bar.

3 Claims, 4 Drawing Figures

EYEGLASS CONSTRUCTION

BACKGROUND AND SUMMARY OF THE INVENTION

This invention relates generally to eyeglass frames and more specifically to those frames which incorporate a laterally extending brow bar to which the individual lenses are directly connected. Such connection is generally either by screw members passing through the brow bar and then through spaced openings provided in the lens to which a retaining means such as a nut is secured to the opposite end of the screw members to maintain the parts in assembled relation, or the screw members are threaded studs fixedly secured to the brow bar and extending rearwardly therefrom. In either case a problem exists, particularly with highly curved lenses, such that when the above described connecting means is tightened, the curved center portion of the lens engages the brow bar. Accordingly, upon tightening one of the threaded studs, a pivotal movement is set up between that central portion of the lens that is in contact with the brow bar and the spaced securement positions or lens openings. This causes a rocking of the lens with respect to the brow bar when the studs are alternately tightened and may even prevent a secure engagement between the brow bar and the lens.

It is generally impractical to shape the inner face of the brow bar to match the particular curvature of the outer face of the lens since there are so many different possibilities of lens curvatures. Accordingly, brow bars are generally formed of straight construction although a slight curvature may exist to at least partially follow the natural contours of the average wearer's face. In order to solve the aforementioned problem, it has been suggested that a portion of the lens be cut away so as to provide a flat surface for receipt of the brow bar to thus prevent rocking of the lenses when mounted. Such construction is shown in U.S. Pat. No. 2,178,038 issued Oct. 31, 1939 (copy enclosed). Such solution, however, involves a rather expensive secondary operation, i.e. grinding of the lenses. Accordingly, it would be desirable to prevent the contact between the outer face of the lens and the inner face of the brow bar during mounting so as to eliminate such undesirable rocking action.

Accordingly, the principal object of the present invention is to provide a construction which enables lenses and particularly those exhibiting a highly curved configuration to be satisfactorily mounted to the brow bar portions of a frame so as to be disposed out of contact therewith, and at the same time so as to extend substantially straight down from the brow bar.

This and other objects of the present invention are accomplished by an eyeglass frame having a generally laterally extending brow bar and at least one lens having a convexly curved outer face. The lens is attached to the brow bar at two laterally spaced positions along the bar and adjacent the upper edge portion of the outer lens face. The lens is provided with an opening at spaced locations corresponding to the attachment positions and each opening includes an enlarged counterbore disposed into the outer lens at an angular relation thereto, and generally coaxial with the openings, the openings and counterbores extending substantially perpendicular to the rear plane of the lenses. The bar includes a pair of posts adapted to extend at least partially through each of the openings. A spacer bushing is held in position on the threaded posts such that the opposite end faces thereof are respectively engaged with the inner face of the brow bar and the counterbore of the lens such that the lens and brow bar are maintained out of contact with each other during both their mounting and final positioning. Such construction enables lenses, even those exhibiting highly convex faces, to be satisfactorily positioned and mounted on brow bars that are either straight or exhibit less curvature than the lens.

Other objects, features and advantages of the invention shall become apparent as the description thereof proceeds when considered in connection with the accompanying illustrative drawing.

DESCRIPTION OF THE INVENTION

In the drawing which illustrates the best mode presently contemplated for carrying out the present invention:

DESCRIPTION OF THE INVENTION

Figure 1:
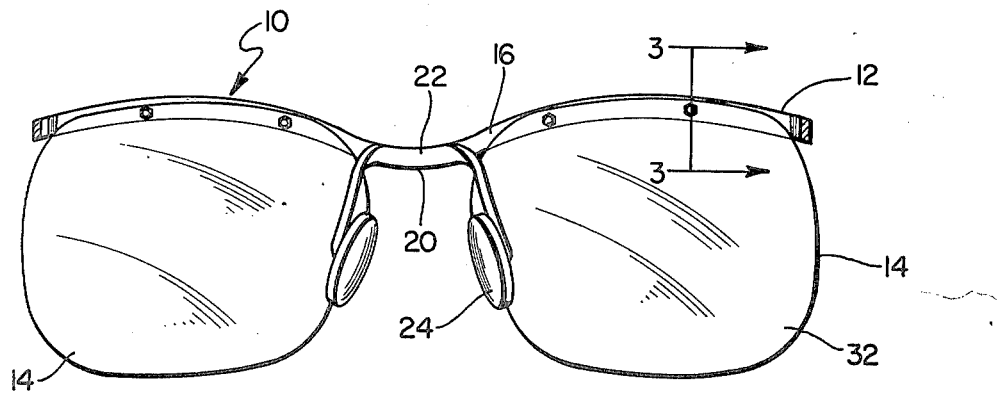
FIG. 1 is a front elevation of an eyeglass construction embodying the present invention.

Referring to the drawing and particularly FIG. 1, an eyeglass construction 10 is shown as including a frame 12 and a pair of lenses 14 attached thereto. The frame 12 includes a brow bar 16 to which frame temples 18 are conventionally attached to support pivotal movement therebetween. A bridge or nose support 20 including a U-shaped member 22 having nose rests 24 at opposite ends thereof is suitably centrally connected to the brow bar as by brazing. The brow bar is constructed of generally flat stock appropriately curved in elevation to follow the structural features of the wearer. In that regard, it should be noted that the brow bar is generally straight when viewed in plan, although it may include slightly curved side portions which extend to opposite sides of the nose support area and to which the lenses 14 are attached.

Each of the side portions 26 of the brow bar 16 includes a pair of rearwardly extending threaded posts or studs 28 disposed substantially perpendicularly to the inner face portions 30 of the side portions 26 of the brow bar 16. The threaded posts 28 may be suitably connected to the brow bars 16 by means of welding and the like and are laterally spaced from each other a distance to provide suitable connective support for the lenses 14 as will hereinafter be evident.

Figure 2:
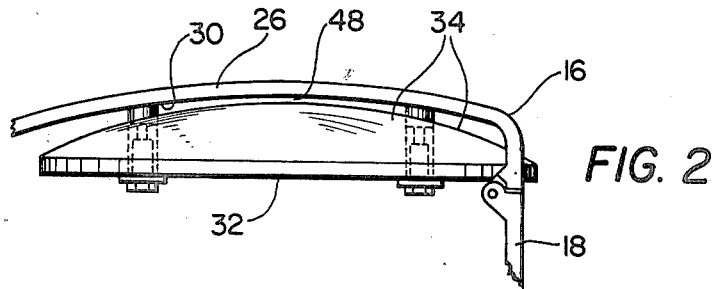
FIG. 2 is a partial top plan view of the eyeglass construction shown in FIG. 1.
Figure 3:
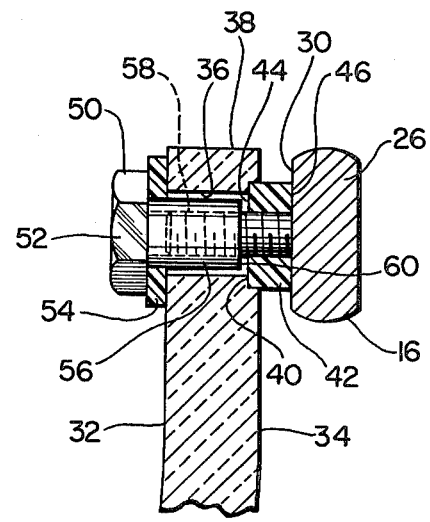
FIG. 3 is a partial sectional view thereof taken along the line 3—3 of FIG. 1.
Figure 4:
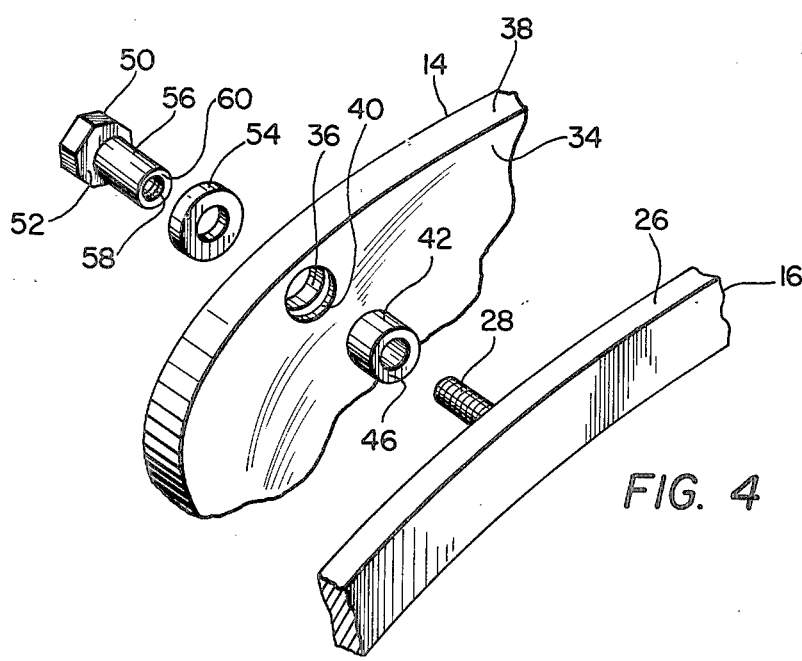
FIG. 4 is a perspective view of a portion of a lens and brow bar in which the means for attaching such components to each other is shown in exploded perspective position.

As may best be seen by reference to FIGS. 2-4, each of the lenses includes an inner face 32 the outer peripheral edge of which defines a flat plane as best shown in FIG. 2, and an outer face 34. The outer face may exhibit a considerable convex curve such that central portions of the lenses would normally contact the inner face 30 of the brow bar intermediate the posts 28 thereof. Each of the lenses 14 is further provided with a pair of smooth bore openings 36 adjacent the upper peripheral edge 38 thereof and spaced laterally apart from each other so as to conform with the spacing of the threaded posts 28. In addition, the openings 36 are counterbored at the outer lens face 34 so as to provide a counterbore 40 of enlarged diameter preferably concentric with opening 36. As will be seen in FIG. 2, the openings and counterbores extend substantially perpendicular to the rear flat plane of the lenses 14 with the bottoms of the counterbores being in a plane generally parallel to said rear flat plane. A cylindrically shaped bushing 42 is adapted to be positioned over each of the posts 28 with the inner face 44 thereof disposed within the counterbore 40 and the outer end face 46 thereof disposed in contact with the inner surface face 30 of the brow bar 16. In this manner, by dimensioning the bushing 42 of suitable axial, that is, front to rear extent, suitable spacing may be provided between the lens and brow bar such that a wide variety of lens curvatures may be accommodated without the lens directly contacting the brow bar. Thus, a space 48 intermediate the connection points whereby the lens and brow bar are interconnected may be maintained. Also, the perpendicular relation between the openings 36 and the rear plane of the lenses insures that the lenses will extend substantially straight down from the brow bar no matter what the front curvature of the lens may be. If this perpendicular relationship did not exist, i.e. if for example the openings 36 were perpendicular to the curved front surface of the lens and hence angularly disposed to the rear plane of the lenses, then the lenses would tilt rearwardly from the brow bar, the extent of said tilt being proportionate to the degree of curvature of the front lens surface.

That end of the threaded post 28 extending through the bushing 42 and into the opening 36 may be suitably engaged by a nut 50 having an enlarged head 52 whereby application of pressure may be brought to bear on those portions of the inner lens face 32 surrounding the openings 36. Generally, a washer 54 is disposed between the head 52 of the nut and the inner surface 32 of the lens 14 to prevent scratching and the like. The washer 54 is formed of a suitable plastic resinous material. The bushing 42 may also be formed of plastic resinous material and may be supplied in kit form with the frame 12 in various axial dimensions such that a variety of lens curvatures may be accommodated while maintaining a minimum space 48 between the outer face 34 of the lens and the inner face 30 of the brow bar. The nut 50 further includes an inwardly extending portion 56 having an axial threaded bore 58 adapted to engage the threaded studs 28. The inner terminal face 60 of such inwardly extending nut portion 56 is adapted to be spaced from the inner face 44 of the bushing 42 when the nut 50 has been fully tightened so as to secure the lenses 14 in the desired position.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An eyeglass construction including in combination a frame having a generally laterally extending eyebrow bar, at least one lens having a relatively pronounced convex curved outer face and a rear face having a peripheral edge defining a substantially flat plane, and means affixing said outer lens face to said bar at spaced portions adjacent the top peripheral edge of said lens so as to suspend said lens from said bar, said means comprising openings extending through said lens at said spaced portions, said openings extending substantially perpendicular to said rear flat plane, a pair of posts operatively associated with said bar and extending at least partially through said lens openings, a bushing mounted on each post and positioned between said brow bar and said other lens face, said bushing being of sufficient length so as to maintain the entire top peripheral portion of said outer lens face in spaced relation to said bar and at the same time maintain said rear flat plane in substantially straight downward disposition no matter what curvature exists in said outer lens face, and fastening means in engagement with the free ends of said posts.

2. The eyeglass construction of claim 1, said openings each having an enlarged counterbore disposed in said outer lens face and proximate said bar, each of said counterbores forming a seat within said openings the bottom of which is substantially parallel to said rear flat plane, said bushings respectively positioned in said seats.

3. The eyeglass construction of claim 2, said fastening means having one end adapted to extend at least partially into said opening from the end thereof opposite said counterbore.

* * * * *